Figure 1:
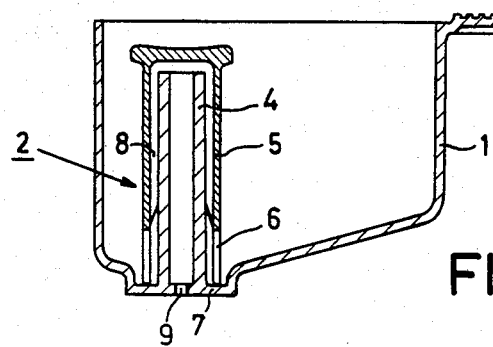

United States Patent [19]

Siemensma

[11] Patent Number: 4,527,467
[45] Date of Patent: Jul. 9, 1985

[54] FILTER DEVICE FOR MAKING TEA

[75] Inventor: Sidonius V. Siemensma, Bedum, Netherlands

[73] Assignee: U.S. Philips Corporation, New York, N.Y.

[21] Appl. No.: 575,140

[22] Filed: Jan. 30, 1984

[30] Foreign Application Priority Data

Feb. 7, 1983 [NL] Netherlands ............. 8300451

[51] Int. Cl.³ .................................. A47J 31/02
[52] U.S. Cl. ................................. 99/279; 99/306; 210/474; 222/204
[58] Field of Search .......... 99/279, 295, 300, 301, 99/302 R, 304, 305, 306, 307; 210/474, 476, 477, 457, 458; 222/204, 416

[56] References Cited

U.S. PATENT DOCUMENTS

| | | | |
|---|---|---|---|
| 2,365,269 | 12/1944 | Hill | 99/304 X |
| 2,403,404 | 7/1946 | Scott | 99/302 R |
| 3,793,934 | 2/1974 | Martin | 99/304 X |
| 3,859,902 | 1/1975 | Neumann et al. | 99/304 |
| 4,200,039 | 4/1980 | Anderl | 99/302 R |

FOREIGN PATENT DOCUMENTS

| | | | |
|---|---|---|---|
| 506346 | 10/1951 | Belgium | 99/306 |
| 926087 | 3/1955 | Fed. Rep. of Germany | 99/305 |
| 7807403 | 1/1980 | Netherlands | 99/295 |

Primary Examiner—Philip R. Coe
Assistant Examiner—Frankie L. Stinson
Attorney, Agent, or Firm—Rolf E. Schneider

[57] ABSTRACT

A device for use in brewing tea comprises a bowl having an outlet aperture formed in its bottom for discharge of brewed tea; an outlet tube communicating with the outlet aperture and extending upwardly from the bottom of the bowl; and a sleeve surrounding and spaced from the outlet tube to provide an annular siphon passageway therebetween, the upper end of the sleeve being closed and the lower end of the sleeve resting on the bowl bottom. Capillary inlet apertures are formed in the lower portion of the sleeve, the dimensional relationship of the capillary inlet apertures to the annular siphon passageway being such that, when the capillary inlet apertures are exposed by the fall of the liquid level in the bowl, the static pressure of the liquid retained in the annular siphon passageway is balanced by the capillary pressure of the liquid retained in the capillary inlet apertures, with the result that the passage of air bubbles through the capillary inlet apertures is prevented. Thereby, upon addition of further liquid to the bowl, the siphoning operation immediately resumes.

3 Claims, 3 Drawing Figures

FILTER DEVICE FOR MAKING TEA

This invention relates to a filter device for making tea, comprising a filter vessel provided with siphoning means for the discharge of tea brewed in the vessel, the siphoning means comprising an outlet pipe which extends upwards from the bottom of the filter vessel and a sleeve which surrounds said pipe so that a passage for liquid is formed between the pipe and the sleeve, and which is closed at its upper end and is formed in its lower portion with inlet apertures.

Such a filter device is known from published Netherlands Patent application No. 7 807 403. In the operation of this known filter device, siphoning ceases at the instant at which the falling level of liquid in the filter vessel reaches the inlet apertures of the siphoning means, because then an air bubble is drawn into the siphoning means through the apertures. When water is next supplied to the filter vessel, siphoning will not begin again until the instant at which the liquid level reaches the upper edge of the outlet pipe. As described in such patent application, such a filter device is very suitable for receiving drops from a trickling coffee filter.

It is an object of the present invention to provide a filter device for making tea, in which when a siphoning operation has been completed, another will begin immediately water is next poured into the filter vessel.

According to the invention there is provided a filter device for making tea, comprising a filter vessel provided with siphoning means for the discharge of tea brewed in the vessel, the siphoning means comprising an outlet pipe which extends upwards from the bottom of the filter vessel and a sleeve which surrounds said pipe so that a passage for liquid is formed between the pipe and the sleeve, and which is closed at its upper end and is formed in its lower portion with inlet apertures which are constructed as capillary passages.

As a result of the capillary construction of the inlet apertures, when these apertures are exposed by the falling level of liquid in the filter vessel during the siphoning operation, the static pressure of the liquid inside the siphoning means is balanced by capillary pressure in the inlet apertures with the result that liquid is retained in the apertures to form a barrier to the entry of air bubbles into the siphoning means. Consequently, the column of liquid in the siphoning means remains intact at the end of the siphoning operation, so that when more water is supplied to the filter vessel siphoning begins again immediately.

In the use of such a filter device for making tea, a quantity of tea leaves is placed in the filter vessel and hot water is poured gradually onto the tea leaves. This allows the tea to draw or steep until the liquid has reached the upper edge of the outlet pipe. Siphoning then begins but at the same time more water is gradually supplied to the filter vessel. However, liquid is siphoned away at a faster rate than that at which it is supplied, with the result that the liquid level in the filter vessel falls to the inlet apertures of the siphoning means. If a filter device of the construction described in the above-mentioned patent application were used, siphoning would cease, after which the filter vessel would have to be refilled completely to bring the siphoning means into operation again. It may happen that the further quantity of water supplied in this manner to the filter vessel is not enough to reach the upper edge of the outlet pipe, with the result that an amount of tea would remain in the filter vessel. If only a few cups of tea are made this is inconvenient, because not enough tea is obtained. This is precluded with the filter device in accordance with the invention, because in this device the siphoning means always remains filled with an unbroken column of liquid and therefore remains ready for immediate operation.

Preferably, the inlet apertures of the siphoning means are formed as slits which extend in the longitudinal direction of the sleeve. Such slits will also remain filled with liquid at the end of the siphoning operation because of capillary action, so that no air can enter the siphoning means through the slits.

The siphoning means is preferably located in a recess or well in the bottom of the filter vessel.

Figure 2:
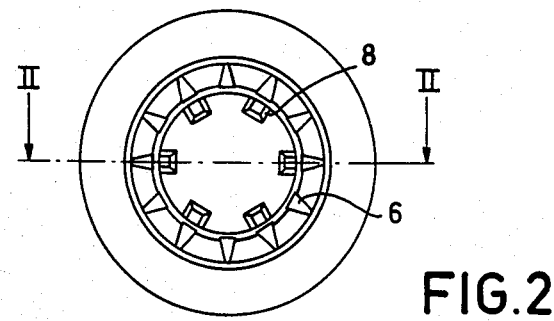
Figure 3:
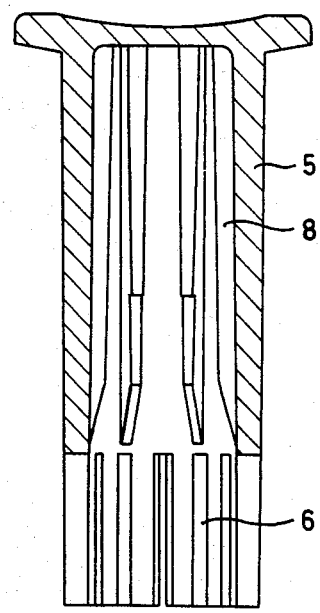

The invention will now be described in more detail, with reference to the accompanying drawings, in which FIG. 1 is a sectional side elevation of the filter vessel, the section being taken through the siphoning means, FIG. 2 is a bottom plan view, on an enlarged scale, of the sleeve of the siphoning means shown in FIG. 1, and FIG. 3 is a sectional view taken on the line II—II in FIG. 2.

A cup-shaped filter vessel 1 or bowl is provided with siphoning means 2. The siphoning means includes a passageway of annular cross-section which surrounds the outlet pipe 4 so that a passage for liquid is formed between the pipe and the sleeve 5. The sleeve 5 is closed at its upper end above the open upper end of the outlet pipe 4 and sits at its lower end in shallow recess or well formed in the bottom of the filter vessel 1. An outlet aperture 9 is formed in the bottom of the recess 7 at the lower end of the outlet pipe or tube 4, which is situated centrally of the recess. Longitudinal ribs 8 are provided on the inner side of the sleeve 5 to fit against the outer surface of the outlet pipe 4 so as to locate the sleeve concentrically around the pipe. The sleeve can be slid onto and off the pipe.

In the lower portion of the cylindrical wall of the sleeve 5 a plurality of slits or narrow slots 6 is formed, each slit extending longitudinally of the sleeve and the slits being evenly distributed around the sleeve. The slits 6 constitute inlet apertures for the entry of liquid from the interior of the vessel or bowl 1 into the siphoning means formed by the sleeve 5 and the outlet pipe 4. The width of the slits 6 is such that capillarity can occur within the slits, and the inlet apertures formed by the slits thus constitute capillary passages. To facilitate manufacture of the sleeve, which can be moulded from a plastic material, the slits are constructed so that the side walls of each slit 6 converge towards the outer side of the sleeve, as can be seen in FIG. 2.

In the use of the filter vessel 1, a quantity of tea leaves is deposited in the vessel and hot water is poured slowly onto the tea leaves. The water filters through the tea leaves and the resulting infusion flows through the slits 6 in the sleeve 5 and gradually rises in the passage between the sleeve and the outlet pipe 4. When the liquid reaches the upper end of the outlet pipe it flows over the lip of the pipe or tube and a siphoning action begins whereby the tea brewed in the filter vessel is discharged through the outlet aperture 9 into a cup placed beneath this aperture. The siphoning continues until there is no liquid left in the filter vessel outside the sleeve 5. When the falling level of liquid in the vessel reaches the slits 6 in the sleeve and begins to expose the slits, liquid is retained in the slits as a result of the static pressure of the liquid inside the siphoning means 2 being balanced by the capillary pressure in the slits. This inhibits or prevents the passage of air bubbles through the slits, so that the column of liquid inside the siphoning means remains unbroken and there is no interruption of the siphoning. When the siphoning ends, the siphoning means remains filled with liquid which is free of air bubbles due to the barrier of liquid in the slits 6. Consequently, when more hot water is poured into the filter vessel siphoning begins again immediately.

Satisfactory results as regards the siphoning and the drawing or brewing time of the tea have been obtained with twelve slits 6 each having a length of 10 mm, a width of 0.3 mm at the outer surface of the sleeve 5 and a width of 1 mm at the inner surface of the sleeve. Other dimensions may also yield satisfactory results. The inlet apertures in the sleeve may have a shape other than that of slits, for example, they may be small holes of circular or other shape, provided that the passage through each aperture has dimensions in directions transverse to the direction of flow through the aperture such that capillarity can occur in the aperture to produce a capillary pressure therein which will balance the static pressure of the liquid inside the siphoning means 2. The dimensions of the inlet apertures should also be such that particles of tea leaves cannot readily pass through the apertures and possibly block the siphoning means. Obviously, the outlet aperture 9 communicating with the lower end of the outlet pipe 4 should not be large enough to allow air bubbles to rise in the outlet pipe when the siphoning ends, since the siphoning means would be drained as a result of such bubbles and would not become operative again immediately more water is supplied to the filter vessel.

It has been found that the siphoning benefits from the location of the siphoning means 2 in the recess 7 in the bottom of the filter vessel.

The filter device according to the invention is very suitable for use in conjunction with an electric appliance provided with a water reservoir and a flow heater with which hot water can be supplied gradually to the filter vessel containing the tea leaves.

What is claimed is:

1. A device for use in brewing tea, which comprises a bowl having an outlet aperture formed in its bottom for discharge of brewed tea; an outlet tube communicating with said outlet aperture and extending upwardly from the bottom of the bowl; a sleeve surrounding and spaced from said outlet tube to provide an annular siphon passageway therebetween, the upper end of said sleeve being closed and the lower end of said sleeve resting on the bowl bottom; and capillary inlet apertures formed in the lower portion of said sleeve, the dimensional relationship of said capillary inlet apertures to said annular siphon passageway being such that, when the capillary inlet apertures are exposed by the fall of the liquid level in the bowl, the static pressure of the liquid retained in the annular siphon passageway is balanced by the capillary pressure of the liquid retained in the capillary inlet apertures, with the result that the passage of air bubbles through the capillary inlet apertures is prevented; whereby, upon addition of further liquid to the bowl, the siphoning operation immediately resumes.

2. A device according to claim 1, in which the capillary inlet apertures are formed as slits extending in the longitudinal direction of the sleeve.

3. A device according to claim 1, in which the bowl is provided with a well in its bottom, the outlet aperture being formed in said well.

* * * * *